June 26, 1962     O. M. RYBOLT     3,041,526
CONTROLLER FOR MOTOR DRIVEN WELDER GENERATORS
Filed March 31, 1959
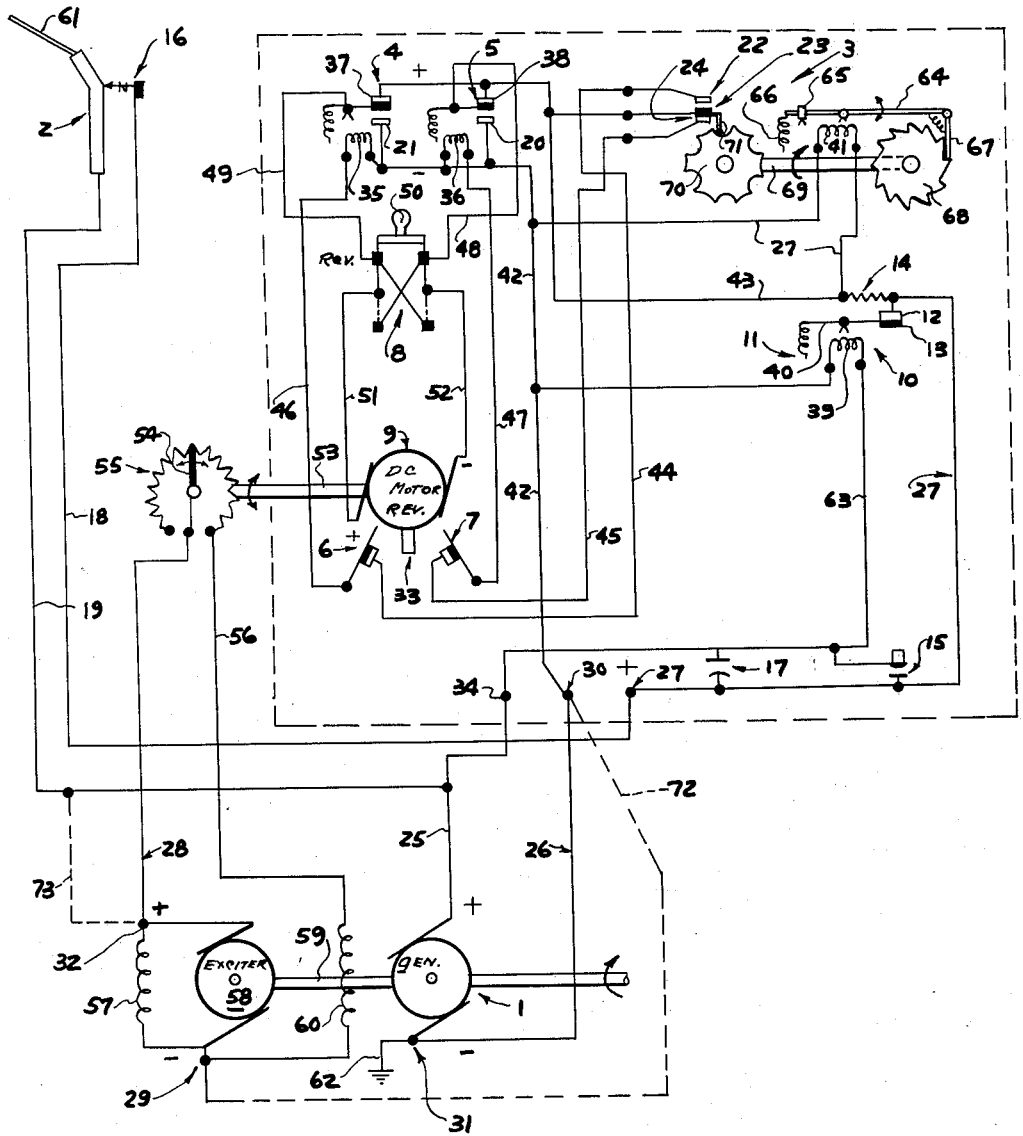
INVENTOR.
ORA M. RYBOLT.
BY
ATTORNEY

United States Patent Office 3,041,526
Patented June 26, 1962

3,041,526
CONTROLLER FOR MOTOR DRIVEN WELDER
GENERATORS
Ora M. Rybolt, 605 Turrill, Lapeer, Mich.
Filed Mar. 31, 1959, Ser. No. 803,164
7 Claims. (Cl. 322—85)

This invention relates to a control system for an electric welder and more particularly to a controller for motor driven welder generators.

It is the object of the present invention to provide in conjunction with a motor driven or otherwise power operated welder generator a controller activated by the operator and normally at a point remote from the generator, whereby at the will of the operator the generator voltage may be increased or decreased.

It is another object to provide a controller including a novel arrangement of relay switches in conjunction with the welder generator together with a novel electric circuit interconnecting said relays and welder whereby the operator may control, either at the generator or at a point remote therefrom, increases or decreases of the welding voltages to meet welding conditions.

It is a further object to provide a motor operated rheostat in the field circuit of the exciter generator and welder generator together with manual control means associated with the welder electrode holder or adjacent the welder generator for selectively rotating the rheostat control in different directions for increasing or decreasing the electrical resistance in said field circuit and correspondingly varying the output voltage.

It is a further object to provide electric power to the controller herein directly from the generator output. Alternately, the power may be delivered from the exciter generator or from some exterior electrical source.

These and other objects will be seen from the following specification and claims in conjunction with the appended drawing in which the figure is a circuit diagram of a conventional welder generator and motor operated field rheostat, together with a series of relays for regulating the generator voltage output.

It will be understood that the above diagram represents a preferred embodiment of the present invention and that other embodiments are contemplated within the scope of the claims hereafter set forth.

Referring to the drawing there is diagrammatically shown a welder generator 1, one of whose brush contacts delivers electrical power through electrode cable 19 to electrode holder 2 and attached welding electrode 61. The other brush of the welder generator is grounded at 62.

There is diagrammatically shown an exciter generator 58 and a rotative power driven shaft 59 for effecting simultaneous rotation of the welder generator and said exciter. Shaft 59 may be connected to any source of rotative power, such as a gas or electric motor or other source.

The generator includes field winding 60, in parallel circuit with field winding 57 of the exciter generator and through leads 28 and 56 is connected to rheostat 55. Said rheostat includes rotatable contact arm 54 secured upon rotative shaft 53 of motor 9. This is a direct current motor operating on approximately 28 volts, for illustration.

Terminals 29 and 32 of exciter generator 58 have a difference in potential. Field winding 60 is connected in parallel with the armature of exciter generator 58 through terminal 29, through lead 56 to the rheostat 55, through sliding contact arm 54, through 28 to terminal 32, which is the positive side of the potential.

The positive and negative terminals of exciter generator 58 furnish the power source to field 60 of the welder generator 1, being regulated by rheostat 55. The field winding 57 of exciter 58 is also connected in parallel or across the armature terminals, being a shunt type of generator.

Motor 9 is reversible and in the manner hereafter described under the control of the operator will rotate shaft 53 in one direction or the other through an arc of less than 360 degrees.

If said contact arm rotates clockwise from the position shown, the total resistance in the rheostat is reduced, reducing the total resistance in the field circuit and providing an increased welding or output voltage. If contact 54 rotates counter-clockwise, the field resistance increases with a corresponding decrease of output voltage from the generator.

The present controller generally indicated within the dotted line enclosure in the drawing consists of the reversible D.C. motor 9 whose driveshaft 53 is adapted to rotate rheostat contact arm 54 in one direction or the other. The direction which said shaft will rotate is determined depending upon which of the two relays 4 or 5 are energized.

The control of relays 4 and 5 is regulated by ratchet relay assembly generally indicated at 3. Said ratchet relay has a magnetic coil 41 which when energized draws armature 64 downwardly. Said armature pivotally mounted at 65, spring-biased at one end at 66 and carries at its other end the spring-biased pivotal pawl 67, adapted on intermittent energizing of coil 41 to effect increments of rotation of ratchet 68. Its shaft 69 carries rotatable segmented operator 70 controlling the movements of movable contact 23 with respect to spaced contacts 22—24. Contact 23, normally biased to contact 24, has an extension 71 operably engaged by the alternate low and high points on operator 70.

There is also provided a safety relay 10 to selectively bring resistance 14 into the circuit when the same is energized during a period of no welding and to shunt said resistance 14 out during welding.

When welding is being done at electrode 61, motor 9 when activated will operate on the voltage developed across the welding arc, i.e., between 20 to 30 volts. When no welding is being done, the open circuit voltage from output terminals 25 and 26 of the generator is higher. This increased voltage energizes magnetic coil 39 of relay 10 so that its movable armature 40 against the action of spring 11 is drawn downwardly disengaging contacts 12 and 13.

Output terminal 25 from the generator joins electrode cable 19 to normally energize electrode 61. When pushbutton switch 16, normally spring biased open is depressed into engagement with a suitable contact in holder 2, the output voltage passes through control wire 18 to the plus terminal of said controller. Current is delivered through bus 27 to safety relay 10. With armature 40 moved downwardly opening contacts 12—13, this elevated voltage in bus 27 passes through resistance 14 thereby causing a voltage drop keeping the controller operating within safe limits.

Should the pushbutton 16 be activated during welding, then the output voltage through terminal 25 connector 34 and lead 63 will be reduced so that magnetic coil 39 is ineffective to open contacts 12 and 13. Thus this reduced output voltage through bus 27 and through contacts 12 and 13 is shunted around resistance 14 for direction to leads 27 and 43 for operating relays 4 and 5.

Should the operator desire to increase or decrease the generator output voltage he activates pushbutton switch 16. The output voltage leaving relay 10 travels through lead 27 through magnetic coil 41 of ratchet relay 3 to the negative side of the line and returns through lead 42 to terminal 30 on the controller through output terminal 26 of the welder generator and is grounded at point 31.

Armature 64 moves downwardly and ratchet 68 rotates a short increment as does also the segmented operator 70. The ratchet relay includes movable contact 23 which is resiliently mounted for selective engagement with either of contacts 22—24 under the control of operator 70, as shown in the drawing and before energization of coil 41 contact 23 engages contact 24.

The slight incremental rotation of segment 70 under the action of ratchet 68 on application of switch 16 moves contact 23 from contact 24 and into engagement with contact 22.

In this illustration, electrical power is delivered from relay 10 through lead 43 to movable contact 23, through contact 22, lead 44, normally closed limit switch 6, and lead 46 for energizing coil 35 of relay switch 4, with the circuit completed to the negtaive side through return lead 42 and terminal 26 back to the generator.

The energizing of coil 35 draws the adjacent armature and movable contact of relay 4, normally spring-biased into engagement with contact 37, disengaging the same so that said movable contact engages contact 21.

Electrical power from lead 43 from relay 10 is delivered to the stationary contacts 37 and 38 of relay switches 4 and 5. With relay 4 energized and contact 37 opened, electrical current from lead 43 travels via contact 38 of relay 5 through the normally closed spring-biased contact and through lead 48 to reversing switch 50.

In the position shown of said switch, the circuit continues through lead 52 to the negative side of direct current motor 9. The circuit is completed to said reversing switch through lead 51, and through lead 49, contact 37, contact 21 to the negative side of the line through lead 42.

This, for example, causes motor shaft 53 to rotate clockwise with corresponding rotation of rheostat control arm 54, decreasing the total resistance in the generator field circuit and causing an increase of the output or welding voltage, for illustration.

Motor shaft 53 continues to rotate in clockwise direction as long as switch 16 is depressed. Alternately the motor will automatically stop, if switch 16 is not released, when cam 33 engages and opens limit switch 6. This breaks the circuit to coil 35 deenergizing same permitting the movable contact of relay 4 to again engage fixed contact 37.

In the event, however, that the operator wishes to effect a reduced output voltage, he again activates pushbutton switch 16 again momentarily activating ratchet relay 3 causing ratchet 68 to rotate the distance of one tooth segment with corresponding rotation of segment 70. This permits movable contact 23 to drop into engagement with contact 24, corresponding to the showing in the drawing.

The circuit is as follows:
Power through lead 43 is through contact 23, contact 24 and lead 45 to normally closed limit switch 7 through lead 47 to coil 36 of relay switch 5 energizing the same and returning to the negative side of the line. At the same time electrical power from lead 43 does not leave the open contact 38 because the movable contact of relay 5 has been magnetically opened into engagement with contact 20. However, the current travels to contact 37 of relay switch 4 and through lead 49 to the opposite side of reverse switch 50.

With said switch in the position shown electrical power travels via lead 51 to the plus side of motor 9 and completes circuit to the negative side through lead 52, the reversing switch 50, lead 48, contact 20 to the negative side of the line. This causes the D.C. motorshaft 53 to rotate in a counterclockwise direction with similar rotation of rheostat contact arm 54 increasing the field resistance. This produces a decreased voltage output for the welded generator. Arm 54 will continue to rotate but less than 360 degrees until the normally open pushbutton switch is released. On failure to release said switch manually, the motorshaft will continue to rotate in a counterclockwise direction until cam 33 on the shaft engages and opens the normally closed limit switch 7 breaking the electrical circuit to coil 36 of relay 5, causing the motor to stop.

If the first activation of pushbutton switch 16 produces an increase of voltage when a decrease is desired, all that is necessary is to manually release pushbutton switch 16 and to again activate the same to reverse the direction of rotation of motorshaft 53.

Simply speaking, pushbutton switch 16 causes the motorshaft to rotate in one direction or the other. Each time the switch 16 is activated the ratchet 68 is rotated one segment. Thus successive activation of pushbutton switch 16 causes intermittent rotation clockwise of the segment 70, intermittently switching the connections of contact 23 with respect to the contacts 22—24 in relay 3. This provides a means of intermittently activating either relay switch 4 or 5 with corresponding rotation of motorshaft 53 in one direction or the other.

The purpose of reversing switch 50 is that when the motor direction is changed, the respective limit switches 6 and 7 will operate on the right side so as to open the proper contacts of relay 4 or 5 depending upon the polarity of the current applied to the armature of the permanent magnate field of motor 9 and contacts 22, 23, 24 of relay 3.

Said reversing switch provides proper contact with limit 6—7 so that when polarity changes, the right polarity is applied to the armature of motor 9 so that the circuit will be interrupted, stopping the motor when cam 33 engages either of the contacts 6 or 7.

As above described, during a welding operation, the voltage output through lead 63 to the coil of relay 10 drops below 45 volts and contacts 12 and 13 are permitted to close or stay closed shorting out resistance 14 and allowance the operation of the controller to take place at the lower voltage.

Pushbutton switch 15 is also provided on said controller between bus line 27 and lead 63. By closing switch 15 motor 9 may be operated to regulate rheostat 55, thus enabling the operator to change output voltage at the controller without utilizing switch 16. Intermittent activation of either switch 15 or 16 will operate motorshaft 53 alternately in opposite directions as above described.

In operation, when pushbutton 15 or 16 is depressed, motor 9 will run in one direction until it is stopped by one of the limit switches 6 or 7 depending upon contacts 22, 23, 24 of ratchet relay 3. By releasing pushbutton 15 or 16 and depressing it again, the motor 9 coupled to rheostat 55 will run in the opposite direction and if continued, the operation will be interrupted by limit switch 6 or 7.

When either of the pushbutton switches 15—16 is opened a spark is present upon opening of the contacts. Condenser 17 is connected between control wire 18 and the output terminal 25—63. This reduces sparking to a minimum.

The present controller is operated by power taken from terminals 25—26 of the welder generator 1 as shown by the solid lines in the drawing. It is contemplated that the controller may be powered and operated from power taken from terminals 29 and 32 of the exciter generator, by removing cable 26 between terminal 30 on the controller and terminal 31 on the welder generator. At the same time a line is connected between terminals 29 and 30 as shown by dotted line 72. Also the electrode cable 19 is connected to terminal 32 on the exciter generator by an additional lead shown in dotted lines at 73.

It is furthermore understood that said controller may be operated by an external source of power and connected as shown by the dotted lines. It is contemplated also that the welder generator may be operated by any source of prime mover applied to rotatable shaft 59. The present controller may operate on gas and electric driven welders and on most rectifier welders with good results.

Having described my invention, reference should now be had to the following claims.

I claim:

1. In a welder a generator adapted for connection to a rotative power drive, having a power output line and a field winding, an exciter having a field winding in parallel circuit with said generator field winding, a voltage controller for said generator consisting of a rheostat with rotatable contact connected in series with said generator, whereby rotation in one direction of said contact increases and in the opposite direction decreases the welding voltage, a motor having an output shaft joined to said rheostat contact, an electrical circuit connecting the generator power output line to said motor in driving relation, and switch means including a normally open manual switch in circuit with said output line and motor for intermittently energizing said motor for alternate rotary movements of its output shaft in opposite directions, said switch means including a pair of normally closed relays in said circuit respectively connecting the generator output line to opposite poles of said motor, and an impulse relay in circuit with said generator output line, manual switch and normally closed relays for alternately opening one of said normally closed relays on activation of said manual switch.

2. In a welder a generator adapted for connection to a rotative power drive, having a power output line and a field winding, an exciter having a field winding in parallel circuit with said generator field winding, a voltage controller for said generator consisting of a rheostat with rotatable contact connected in series with said generator, whereby rotation in one direction of said contact increases and in the opposite direction decreases the welding voltage, a motor having an output shaft joined to said rheostat contact, an electrical circuit connecting the generator power output line to said motor in driving relation, and switch means including a normally open manual switch in circuit with said output line and motor for intermittently energizing said motor for alternate rotary movements of its output shaft in opposite directions, said switch means including a pair of normally closed relays in said circuit respectively connecting the generator output line to opposite poles of said motor, a magnetic coil for each relay, and an impulse relay in circuit with said generator output line, manual switch and coils selectively for alternately energizing one of said coils on activation of the manual switch for driving said motor in one direction.

3. In a welder a generator adapted for connection to a rotative power drive, having a power output line and a field winding, an exciter having a field winding in parallel circuit with said generator field winding, a voltage controller for said generator consisting of a rheostat with rotatable contact connected in series with said generator, whereby rotation in one direction of said contact increases and in the opposite direction decreases the welding voltage, a motor having an output shaft joined to said rheostat contact, an electrical circuit connecting the generator power output line to said motor in driving relation, and switch means including a normally open manual switch in circuit with said output line and motor for intermittently energizing said motor for alternate rotary movements of its output shaft in opposite directions, said switch means including a pair of normally closed relays in said circuit respectively connecting the generator output line to opposite poles of said motor, a magnetic coil for each relay, and an impulse relay in circuit with said generator output line, manual switch and coils selectively for alternately energizing one of said coils on closing of said manual switch for driving said motor in one direction, a successive closing of said manual switch energizing said impulse relay to alternately energize the other of said coils for driving said motor in the opposite direction.

4. In a welder a generator adapted for connection to a rotative power drive, having a power output line and a field winding, an exciter having a field winding in parallel circuit with said generator field winding, a voltage controller for said generator consisting of a rheostat with rotatable contact connected in series with said generator, whereby rotation in one direction of said contact increases and in the opposite direction decreases the welding voltage, a motor having an output shaft joined to said rheostat contact, an electrical circuit connecting the generator power output line to said motor in driving relation, and switch means including a normally open manual switch in circuit with said output line and motor for intermittently energizing said motor for alternate rotary movements of its output shaft in opposite directions, said switch means including a pair of normally closed relays in said circuit respectively connecting the generator output line to opposite poles of said motor, a magnetic coil for each relay, an impulse relay in circuit with said generator output line, manual switch and normally closed relays for alternately energizing one of said coils on closing of said manual switch for driving said motor in one direction, a pair of spaced normally closed limit switches respectively connected to each magnetic coil, and a cam on said motor output shaft spaced between said limit switches on predetermined rotation thereof, engageable with a limit switch for de-energizing said motor.

5. In a welder a generator adapted for connection to a rotative power drive, having a power output line and a field winding, an exciter having a field winding in parallel circuit with said generator field winding, a voltage controller for said generator consisting of a rheostat with rotatable contact connected in series with said generator, whereby rotation in one direction of said contact increases and in the opposite direction decreases the welding voltage, a motor having an output shaft joined to said rheostat contact, an electrical circuit connecting the generator power output line to said motor in driving relation, and switch means including a normally open manual switch in circuit with said output line and motor for intermittently energizing said motor for alternate rotary movements of its output shaft in opposite directions, said switch means including a pair of normally closed relays in said circuit respectively connecting the generator output line to opposite poles of said motor, a magnetic coil for each relay, an impulse relay in circuit with said generator output line, manual switch and normally closed relays for alternately energizing one of said coils on closing of said manual switch for driving said motor in one direction, said impulse relay including a pair of spaced contacts respectively connected to said coils, an intermediate power delivery contact engageable with one of said spaced contacts, and a coil and armature ratchet means on intermittent closing of said manual switch alternately and successively connecting said power contact with said spaced contacts respectively.

6. In a welder a generator adapted for connection to a rotative power drive, having a power output line and a field winding, an exciter having a field winding in parallel circuit with said generator field winding, a voltage controller for said generator consisting of a rheostat with rotatable contact connected in series with said generator, whereby rotation in one direction of said contact increases and in the opposite direction decreases the welding voltage, a motor having an output shaft joined to said rheostat contact, an electrical circuit connecting the generator power output line to said motor in driving relation, and switch means including a normally open manual switch in circuit with said output line and motor for intermittently energizing said motor for alternate rotary movements of its output shaft in opposite directions, a safety relay including a magnetic coil in closed circuit with said generator output line, an electric resistance, and a pair of normally closed contacts shunting out said resistance on closing of said manual switch during welding, the closing of said manual switch with no welding providing an increased voltage to said magnetic coil opening said contacts.

7. In a welder a generator adapted for connection to a rotative power drive, having a power output line and a field winding, an exciter having a field winding in parallel circuit with said generator field winding, a voltage controller for said generator consisting of a rheostat with rotatable contact connected in series with said generator, whereby rotation in one direction of said contact increases and in the opposite direction decreases the welding voltage, a motor having an output shaft joined to said rheostat contact, an electrical circuit connecting the generator power output line to said motor in driving relation, and switch means including a normally open manual switch in circuit with said output line and motor for intermittently energizing said motor for alternate rotary movements of its output shaft in opposite directions, said switch means including a pair of normally closed relays in said circuit respectively connecting the generator output line to opposite poles of said motor, a magnetic coil for each relay, an impulse relay in circuit with said generator output line, manual switch and normally closed relays for alternately energizing one of said coils on closing of said manual switch for driving said motor in one direction, a safety relay including a magnetic coil in closed circuit with said generator output line, an electric resistance, and a pair of normally closed contacts shunting out said resistance on closing of said manual switch during welding, the closing of said manual switch with no welding providing an increased voltage to said magnetic coil opening said contacts.

References Cited in the file of this patent

UNITED STATES PATENTS

| | | |
|---|---|---|
| 922,219 | Volkenburg | May 18, 1909 |
| 1,736,471 | Wagner et al. | Nov. 19, 1929 |
| 2,140,351 | De Croce | Dec. 13, 1938 |
| 2,305,206 | Strobel | Dec. 15, 1942 |
| 2,438,634 | Farrow | Mar. 30, 1948 |
| 2,642,515 | Bagg | June 16, 1953 |